June 9, 1953
D. L. LESLIE ET AL
2,641,090
MACHINE FOR FASHIONING END PORTIONS OF PRISMATIC BODIES
Filed April 2, 1951
4 Sheets-Sheet 1
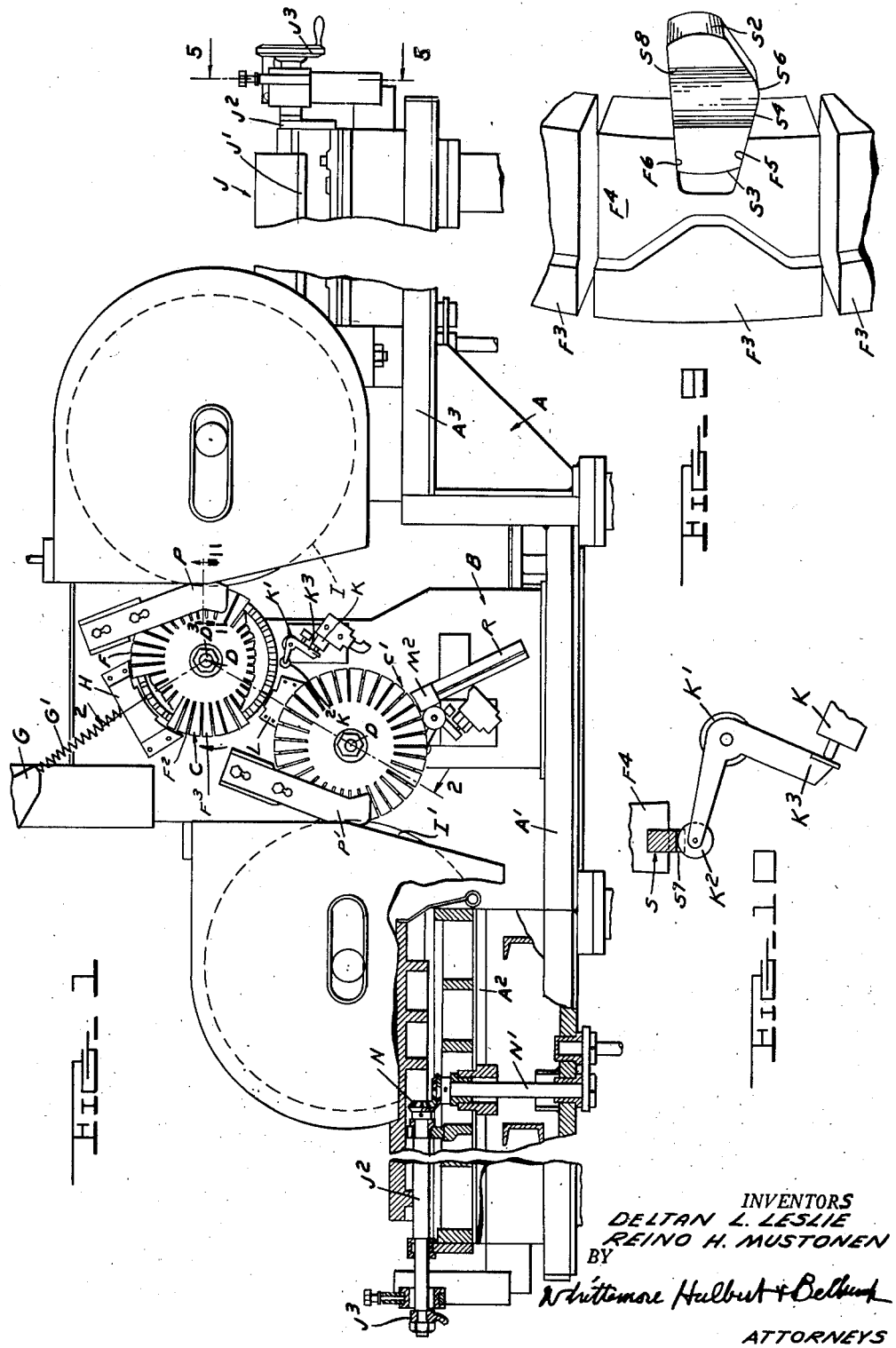
INVENTORS
DELTAN L. LESLIE
REINO H. MUSTONEN
BY
Whittemore Hulbert + Belknap
ATTORNEYS

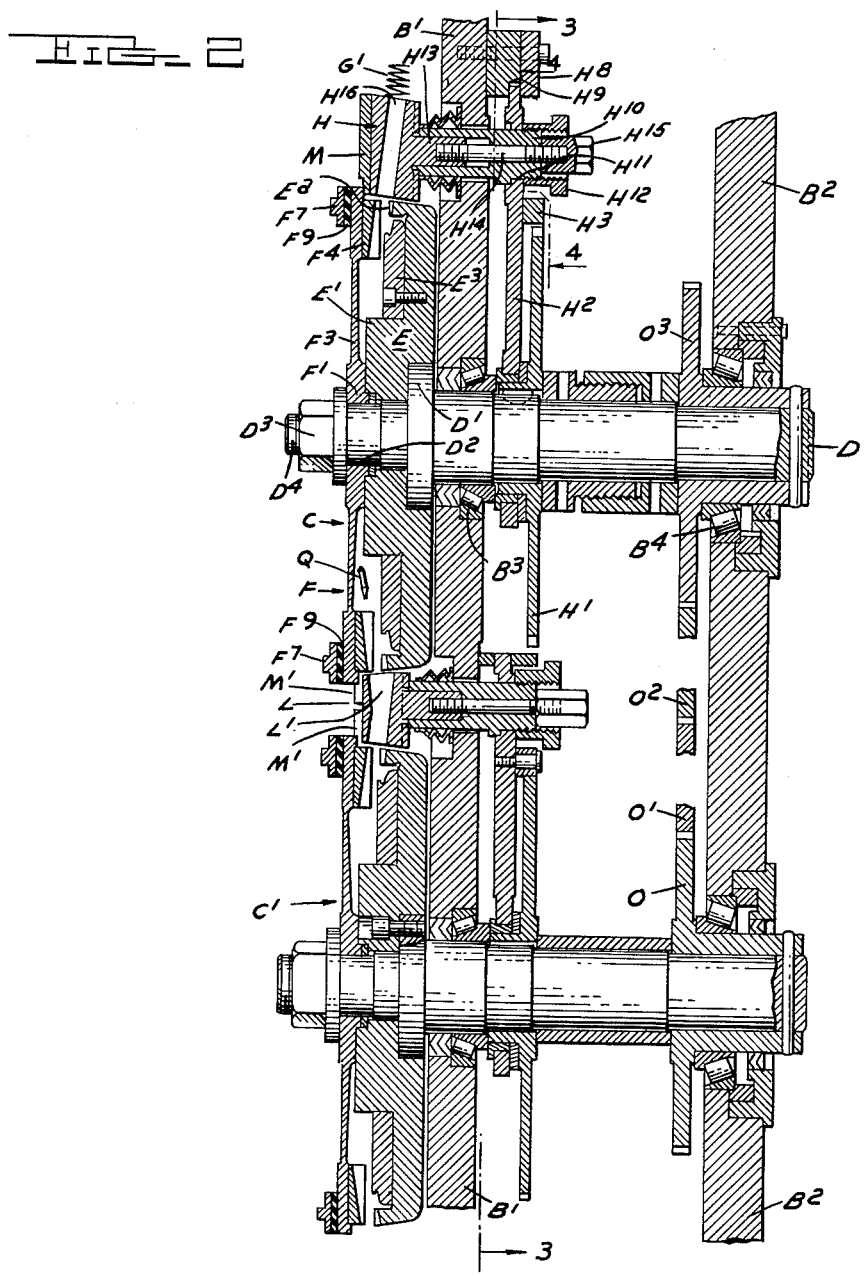

June 9, 1953 D. L. LESLIE ET AL 2,641,090
MACHINE FOR FASHIONING END PORTIONS OF PRISMATIC BODIES
Filed April 2, 1951 4 Sheets-Sheet 3
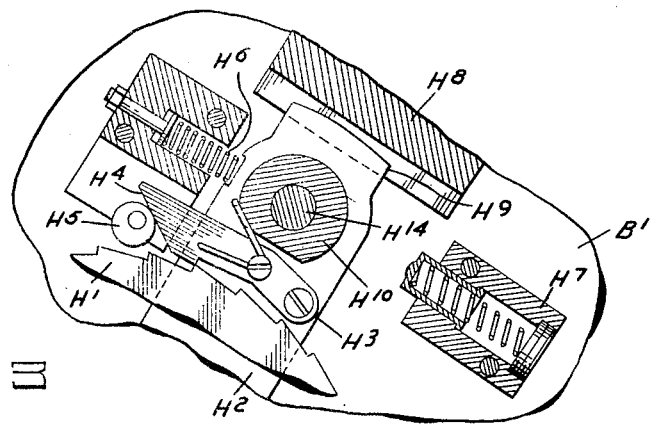
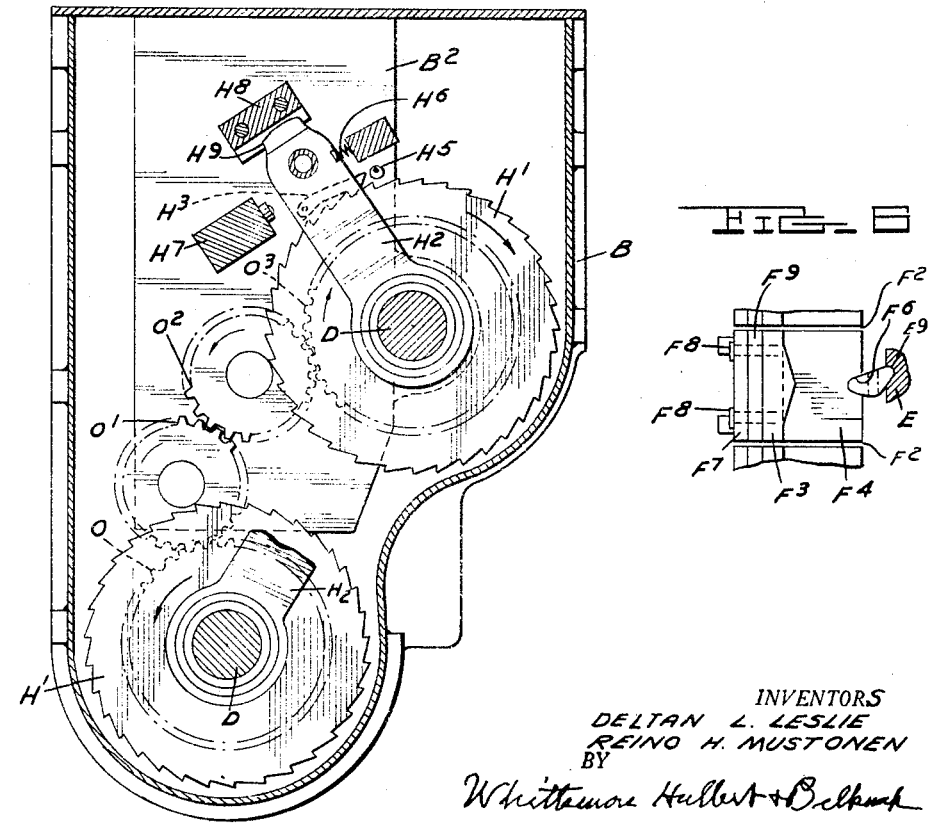
INVENTORS
DELTAN L. LESLIE
REINO H. MUSTONEN
BY
Whittemore Hulbert + Belknap
ATTORNEYS

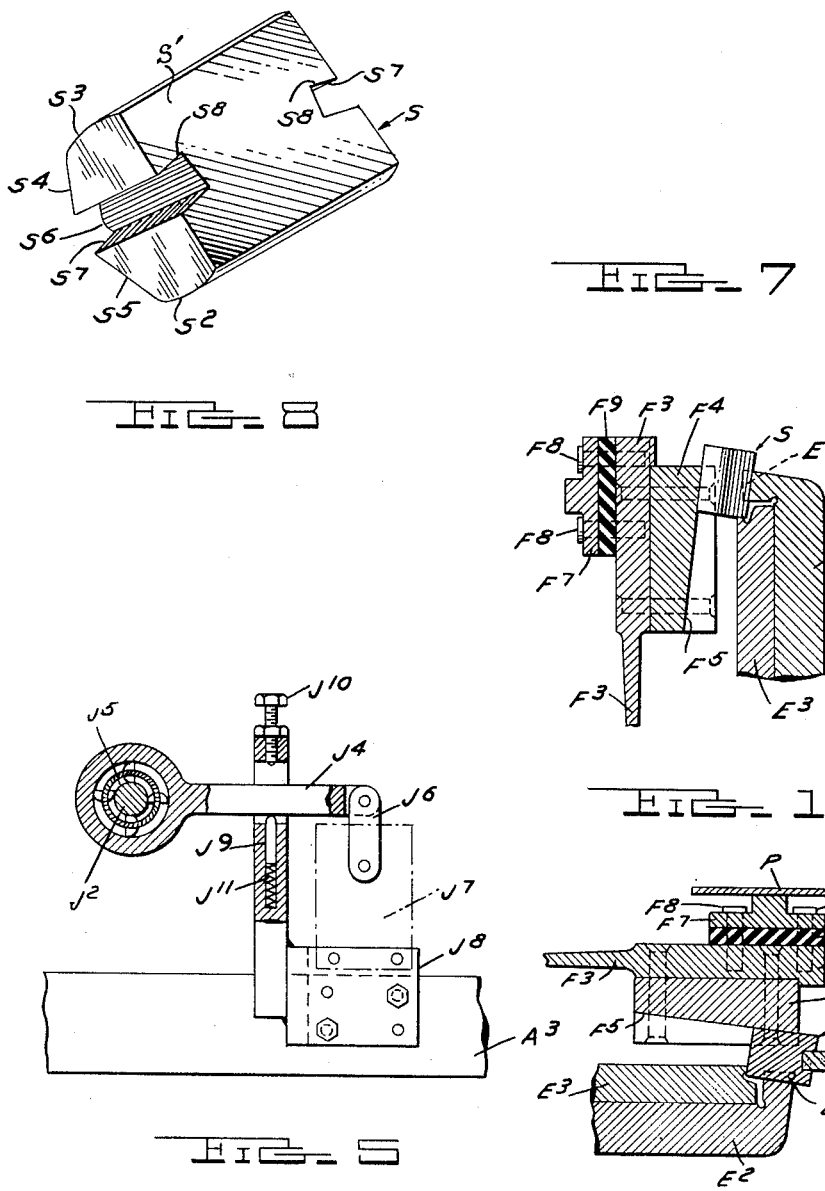

Patented June 9, 1953

2,641,090

UNITED STATES PATENT OFFICE 2,641,090

MACHINE FOR FASHIONING END PORTIONS OF PRISMATIC BODIES

Deltan L. Leslie, Birmingham, and Reino H. Mustonen, Detroit, Mich., assignors to The Gear Grinding Machine Company, Hamtramck, Mich., a corporation of Michigan Application April 2, 1951, Serial No. 218,832

7 Claims. (Cl. 51—108)

1

The invention relates generally to the manufacture of prismatic bodies such as sprags used in one-way clutch constructions.

More specifically the invention relates to means for fashioning the end portions of said prismatic bodies, and it is the primary object of the invention to accomplish this in an automatic machine capable of performing the work with great rapidity.

To this end the invention consists in a construction of machine including a continuously rotating work holder which is provided with means for automatically loading the same with the prismatic bodies during the continuous movement thereof.

The invention further consists in a construction of work holder capable of successively receiving the individual prismatic bodies or sprags to expose an end portion of each and for holding them in predetermined angular relation to the grinder or cutter during the fashioning operation.

The invention further consists in a construction in which the prismatic bodies after the fashioning of one end portion thereof are automatically transferred to another like rotary work holder for exposing the opposite end portion of each and for carrying the same into operative relation to another grinder wheel or cutter.

The invention further consists in a construction in which automatic adjustment is made to compensate for any wear in the grinder wheel so as to obtain great accuracy in the finished product.

The invention further consists in means for automatically gauging the finished product and for stopping the machine in case of any inaccuracy therein.

The invention further consists in other features of construction as more fully hereinafter set forth.

In the drawings:

Fig. 1 is a front elevation of the machine partly in section;

Fig. 2 is an enlarged section on line 2—2, Fig. 1;

Fig. 3 is a section on line 3—3, Fig. 2;

Fig. 4 is a section on line 4—4, Fig. 2;

Fig. 5 is a sectional elevation substantially on line 5—5, Fig. 1;

Fig. 6 is an end view of the construction shown in Fig. 7 illustrating the clamping of a prismatic body in the work holder;

Fig. 7 is a section similar to a portion of Fig. 2 on an enlarged scale and showing a prismatic body in clamped position;

2

Fig. 8 is a perspective view of a prismatic sprag after the end notching of the same by the machine;

Fig. 9 is an end elevation of one of the clamping fingers showing a sprag in engagement therewith;

Fig. 10 is an enlarged view of a portion of Fig. 1 and partly in section showing the means for controlling the ground depth of the channel; and Fig. 11 is a section on line 11—11, Fig. 1.

The machine is capable of fashioning the end portions of prismatic bodies to any desired form, but as herein specifically illustrated and described it is designed to form notches in the end portions of sprags for one-way clutches. The purpose of these notches is to receive an energizing garter spring for an annular series of sprags which holds them individually in frictional contact with the cooperating members of the clutch. It is therefore necessary that each notch should be at a predetermined angle to the cross sectional contour of the sprag, and further to retain the energized spring the notch should be undercut at a predetermined angle to the longitudinal axis of the sprag. For example, and as illustrated in Fig. 8, the sprag S is of a cross sectional contour including a generally radially extending side $S'$, eccentric diametrically opposite cam portions $S^2$ and $S^3$ and a substantially V-shaped opposite side portion including oppositely angling portions $S^4$ and $S^5$, and a rounded nose portion $S^6$. The notch $S^7$ extends transversely of the sprag at a predetermined angle to the side $S'$ and in longitudinal section. The notch is undercut on one side thereof as indicated at $S^8$, which is at a predetermined angle to the longitudinal axis of the sprag.

General construction of the machine

As shown in Fig. 1 the machine comprises generally a bed member A having a central portion $A'$ and portions $A^2$ and $A^3$ at opposite ends thereof and at higher levels. On the central portion $A'$ is mounted a vertically extending frame B including spaced parallel front and rear plates $B'$ and $B^2$ for carrying rotary work holders C and $C'$. The latter are arranged in the same vertical plane in front of the plate $B'$ and each is mounted upon a horizontal shaft D journaled in radial and end thrust bearings $B^3$ and $B^4$, respectively, on the plates $B'$ and $B^2$. A work loading mechanism is provided for the holder C and a transfer mechanism is arranged between the holders C and $C'$ for shifting the work from one to the other. Grinder wheels are mounted on carriages, respectively, on the portions $A^2$ and $A^3$ of the bed and these wheels are in operative relation to the work carried respectively by the holders C and C'.

Rotary work holder

Each rotary work holder is mounted on a portion of its shaft D projecting forward from the frame B and includes a rear head E and a forward head F. The rear head has a hub portion $E'$ which is bolted to a radial flange $D'$ on the shaft D and the forward head F has its hub portion $F'$ mounted on a smaller diameter portion $D^2$ of the shaft but has an interlocking engagement with the hub $E'$, being detachably secured thereto by means of a clamping nut $D^3$ on a threaded outer end portion $D^4$ of the shaft. The head F has a comparatively thin tapering portion extending outwardly from the hub $F'$, which portion is divided by radial slots $F^2$ into a series of spring fingers $F^3$ each of which is adapted to individually clamp one of the prismatic bodies against an adjacent portion of the head E. Inasmuch, however, as the sprags must be held in a predetermined angular relation to the grinder wheel during the forming of the notches therein, each of the fingers $F^3$ has on its outer end and its inner side jaw portion $F^4$ preferably formed of non-magnetic material (to avoid any attraction between the same and the prismatic body if the latter is formed of magnetic material) suitably fashioned to form a substantially radially extending socket portion for receiving the sprag. This socket is of a cross sectional contour having sides $F^5$ and $F^6$ for engaging, respectively, the sides $S'$ and $S^5$ of the sprag. The sides are also at such angles to the plane of rotation as to form the notch $S^7$ at a predetermined angle to the side $S'$ of the sprag. Longitudinally the socket in the jaw $F^4$ is inclined to the plane of rotation so as to produce the undercut angle $S^8$ at one side of the notch $S^7$. The head E is formed with socket portions $E^a$ registering with the sockets in the jaw members $F^4$ and of a form to receive the diametrically opposite portion of the sprag to clamp the latter between the heads F and E as will be later described. Mounted on the hub $E'$ between the sides E and F is an exchangeable annular disk member $E^3$, the periphery of which forms a stop in alignment with the sprag receiving sockets. Thus where sprags of a particular length are to be notched, a member $E^3$ is selected to limit the inward movement of each sprag in its socket so that the outer end thereof will be in proper relation to the grinder wheel which notches the same. The normal relation between the heads E and F is such that the fingers $F^3$ will clamp the sprags against the head E. However, when the sprags are engaged with the sockets and also when discharged therefrom, the fingers $F^3$ are sprung outward (by cam means mounted on the plate $B'$ and later described) so that the sprag may freely enter the same. During the further rotation of the holder C the sprags will be successively presented to the grinder wheel which grinds the notches therein and while in such position each sprag must be firmly clamped to prevent displacement. For this purpose a presser plate $F^7$ is movably secured to the outer end portion of each finger by headed pins $F^8$ and a yieldable member $F^9$ of resilient material is interposed between this plate and the finger. A stationary cam P mounted on the plate $B'$ and later described engages the presser plates while traveling past the grinder wheel, thereby developing a resilient clamping pressure on the work.

Loading shuttle

The prismatic bodies which are to be operated upon must first be arranged in longitudinally aligned ordered series, this being preferably accomplished by an orienting mechanism forming no part of the instant invention. However Fig. 1 illustrates an inclined conduit or chute G through which the aligned bodies are fed to the machine. Between this chute and the periphery of the holder C is a shuttle member H which oscillates about the axis of the shaft D so as to alternately rotate with the holder for a short distance and then be quickly returned to its original position, the construction being as follows. Mounted on and keyed to the shaft D inside of the front plate $B'$ of the frame B is a ratchet wheel $H'$, the teeth of which are preferably the same in number as the fingers $F^3$ of the head F. On the hub of the ratchet wheel $H'$ is pivotally mounted a rock arm $H^2$ which is of greater radial length than the diameter of said wheel. A dog or pawl $H^3$ is pivotally mounted on the arm $H^2$ to engage with teeth of the ratchet wheel whereby the rotation of said wheel will carry the dog and arm with it for a limited distance. A cam portion $H^4$ on the dog will during its movement ride over a stationary pin $H^5$ mounted on the plate $B'$ to disengage the pawl from the tooth of the ratchet wheel. A spring $H^6$ bearing against the forward side of the arms $H^2$ is compressed during its forward movement and upon release of the dog will quickly return the arm to its original position. A spring pressed buffer $H^7$ cushions the return movement of the arm and protects the pawl and teeth of the ratchet wheel from too great an impact. Thus during the continuous rotation of the ratchet wheel the arm $H^2$ oscillates, traveling forward therewith for a distance equal to one tooth of the ratchet wheel and then being quickly returned to engage another tooth. A slotted guide $H^8$ mounted on the plate $B'$ engages the outer end $H^9$ of the arm to steady the movement thereof. The shuttle H is arranged over the periphery of the heads E and F and is mounted on the outer end portion of the arm $H^2$ through the medium of a tubular arm $H^{10}$ extending outward through a slot in the head E. The arm $H^{10}$ extends through an aperture in the arm $H^2$ and has a shoulder $H^{11}$ and a clamping nut $H^{12}$ for securely fastening said arms to each other. The shuttle H has a shank portion $H^{13}$ entering the tubular arm $H^{10}$ and a rod $H^{14}$ threadedly engaged with said shank extends rearward to engage a nut $H^{15}$ at the rear end of the arm $H^{10}$. The shuttle has a channel $H^{16}$ extending therethrough, which is of the cross sectional contour of the sprag or prismatic body but is sufficiently larger to permit free movement of the latter therethrough. At the outer end of this channel is a flexible conduit preferably formed of a helical coil $G'$, which also is of the same cross sectional contour as the sprag and which at its outer end is connected to the chute G. Thus prismatic bodies or sprags passing through the chute G will be directed into the channel $H^{16}$ of the shuttle, which is successively registered with the sockets formed in the jaws $F^4$ of the holder C, traveling with the latter for a sufficient time for the sprag to engage the socket. The shuttle is then snapped back by the spring $H^6$ to register its channel $H^{16}$ with another socket for the loading of the same with another sprag. In this manner the constantly rotating holder C will be successively loaded with work pieces. During transfer of the sprag from the shuttle to the socket in the work holder C, the resilient finger engages a cam M previously referred to which springs it outward together with the jaw $F^4$ for the free entrance of the sprag.

Fashioning means

The purpose of the machine is to fashion the ends of the prismatic bodies and, where these are sprags for use in one-way clutches, the ends are notched or grooved to receive energizing garter springs. The notches are undercut on one side thereof to retain the springs, and they are also at an oblique angle transversely of the sprag so that the spring when engaged therewith will impart a torque thereto. If the sprags are hardened before notching, the notches must be cut by a grinder. For this purpose a grinder I is mounted upon a carriage J, which in turn is mounted upon guideways J' extending longitudinally on the portion $A^3$ of the frame. The plane of rotation of the grinder wheel is the same as that of the rotary head C, and in the properly adjusted position of the carriage J it will extend into the path of the outer end portions of the sprags loaded in the holder. The thickness of the peripheral portion of the grinder wheel is equal to the width of the notch or groove to be ground, and the direction of the cut is determined by the shape of the socket $F^5$ in the clamping jaw. This in a radial direction is obliquely inclined with respect to the plane of rotation of the holder which produces the undercutting of the notch. The socket $F^5$ also holds the sprag in its transverse plane at the desired angle to the grinder wheel. Consequently, each sprag, as it is carried by the holder through a path intersecting the grinder wheel, will have a notch ground therein of the desired form in the plane of said grinder wheel. The depth of the notch is determined by the position of the carriage J, and as the grinder wheel wears away this carriage must be adjusted to compensate by mechanism now to be described.

Carriage adjusting mechanism

The carriage J is moved on the guideways J' by a feed screw $J^2$, which at its outer end has a wheel $J^3$ for manually operating the same. In addition to this manually operating means, there is an automatic adjusting means comprising a rock arm $J^4$ mounted on the shank of the screw through the medium of a one-way clutch $J^5$. The outer end of the rock arm is connected by a link $J^6$ with the core member $J^7$ of a solenoid $J^8$ mounted on the frame $A^3$. The rock arm $J^4$ passes through a slot in a guide member $J^9$ and a set screw $J^{10}$ regulates the length of free movement of the arm in this slot. A spring $J^{11}$ actuates the arm counter to the direction of movement by the solenoid; thus if the solenoid is intermittently energized, it will rock the arm $J^4$ and through the one-way clutch will rotate the screw $J^2$. The solenoid is controlled by a limit switch K, which is operated by notch depth gauging means of the following construction. K' is a rocker member mounted adjacent to the rotary holder C at a point in its rotation upon the grinder wheel. $K^2$ is a roller carried by the rocker member K' and extending into the ground groove to contact with the bottom thereof. $K^3$ is a bell crank lever on the rocker member K' which extends in proximity to the limit switch K. The arrangement is such that if the notches ground in the sprags are of proper depth the limit switch will not be actuated, but if the notch is slightly less in depth than desired it will through the medium of the roller $K^2$, rocker K' and bell crank $K^3$ close the limit switch K and energize the solenoid $J^8$. This will adjust the screw $J^2$ in a direction to feed the carriage J to the left Fig. 1, moving the grinder wheel towards the work. After each notched sprag passes the roller $K^2$ the limit switch will open, deenergizing the solenoid and permitting the spring $J^{11}$ to return the rock arm, and therefore, as the notched sprags successively engage the roller $K^2$, they will successively energize the solenoid rotating the screw to feed the carriage and grinder wheel. As soon, however, as the grinder wheel is adjusted to grind a notch of the proper depth, the limit switch will remain in open position and the feeding of the carriage will be stopped.

Means for fashioning the opposite ends of the sprags

For relatively short sprags used in certain one-way clutches it is only necessary to form a notch in one end thereof for receiving the energizing spring. On the other hand with sprags of greater length it is desirable to notch both ends to receive a pair of energizing springs. This can be accomplished by transferring the notched sprags from the work holder C to the similar work holder C' in which the opposite end of each sprag will be exposed. The work holder C' is the same in construction as the work holder C previously described and the transfer of sprags from one to the other is effected by a shuttle L. This is substantially the same in construction as the shuttle H and is operated in the same manner in relation to the holder C'. There is, however, one important difference between the construction of the shuttle H and that of the shuttle L. In the former the channel $H^{16}$ is straight from end to end and is at the same angle to the plane of rotation of the holder as the sockets in the latter. However, when the sprags are reversed end for end, the angle of the sockets to the plane of rotation must be correspondingly reversed. Consequently, in transferring a sprag from a socket in the holder C to a socket in the holder C' through the shuttle L, it must be turned. This is accomplished by forming a channel in the shuttle L with a bell-mouthed portion L' adjacent to the holder C, one side of which is aligned with the socket in the holder C while the opposite side is aligned with the socket in the holder C'. The length of this channel being greater than the maximum length of sprags, it will be evident that a sprag released from a socket in the holder C will be turned to enter the registering socket in the holder C'.

Means for releasing clamping pressure of the jaws during loading, transfer and unloading of sprags The resilient fingers $F^3$ are biased to move the jaw portion $F^4$ so as to clamp the sprag in engagement therewith and this would prevent the free movement of sprags into engagement with the sockets in the holder. It is therefore necessary to slightly displace the fingers $F^3$ in an outward direction when in registration with the shuttles H and L. This is accomplished by the cam M, above referred to, adjacent to the shuttle H and by a cam M' similarly positioned with respect to the shuttle L. The feeding of the sprags through the shuttles can be accomplished solely by gravity but to render the operation more certain, an air blast is directed against the end of the sprag when moving through the shuttle. As illustrated a gooseneck flattened air tube Q extends inward between the heads E and F with its discharge nozzle located to direct an air current against the end of the sprag in the shuttle L while it is in registration with the socket in the holder C'.

A grinder I', similar to the grinder I, is mounted on the carriage longitudinally adjustable on the portion $A^2$ of the frame, the grinder being in operative relation to the work carried by the holder C'. The manual and automatic means for adjusting this grinder is similar to that described in connection with the grinder I and need not be referred to more in detail.

The work holders and the grinders are driven by electric motors through the medium of transmission mechanisms of any suitable construction and not shown in detail. The work holders rotate at relatively low speed such, for instance, as 3 R. P. M., and the grinder wheels are rotated at a speed best adapted for performance of the work. Inasmuch as the grinder wheels wear and are progressively diminishing in diameter, the ratio of the transmission mechanism is automatically adjusted to maintain substantially constant peripheral velocity of said grinder wheels. This is accomplished by a construction of transmission mechanism not a part of the instant invention, which is controlled by the rotation of the said screw $J^2$. Thus as shown, bevel gear wheels N at the inner end of said feed screw communicate motion to a vertical shaft N' extending down into the base of the machine and through suitable connections (not shown) the transmission is adjusted thereby. The shafts D of the rotary work holders C and C' are connected to each other through the medium of a gear train including the gear wheels O, O', $O^2$ and $O^3$ so that the two shafts will be rotated at the same speed but in opposite directions. As illustrated in Fig. 1, the direction of rotation of the holders C is clockwise while the direction of rotation of the holder D is counterclockwise. This causes the adjacent portions of these two holders where the transfer shuttle is located to travel in the same general direction.

*Operation*

The sprags, or other prismatic bodies to be fashioned, are fed from the chute G through the helical conduit G' into the shuttle H, which as before described loads the holder C. In the loading position the resilient fingers $F^3$ are moved outward by the cam M to enlarge the socket sufficiently for the free entrance of the sprags from the registering channel in shuttle. After passing the loading position and disengagement from the cam M, the resilient fingers will clamp the sprags but further clamping pressure is providing during the grinding operation. This is accomplished by the cam member P mounted on the plate B' and extending over a portion of the rotary holder C to bear against the lugs $F^9$ on the plates $F^6$. This will compress the resilient members $F^8$ and develop sufficient pressure on the jaws $F^4$ to rigidly clamp the sprags in their sockets while passing the grinder wheel. When the holder C advances into registration with the transfer shuttle L', clamping pressure is released by engagement of the fingers $F^3$ with the cam M' so that the sprag freely enters the socket. In this it is assisted by the air blast from the holders C and continues its movement through the shuttle into the registering socket of the holder C'. While passing through the channel L' of the shuttle L, the sprag is turned as previously described. The sprags transferred to the holder C' are carried past the second grinder wheel being clamped by a cam member P' similar to the cam P. This second grinder wheel notches the opposite ends of the sprags after which they are carried to a point of discharge through a chute R. At this position a cam $M^2$, similar to cams M and M', releases the clamping pressure so that the sprags will be discharged either by gravity alone or by the assistance of an air blast.

What we claim as our invention is:

1. In a machine for notching the ends of prismatic sprags, a rotary work holder including a rear head, a front head having a series of radially extending resilient fingers, and a jaw on each finger spaced from said rear head and fashioned to form therewith a socket for holding said sprag to extend in a generally radial direction but at a limited angle to the plane of rotation, a grinder positioned to cut a notch in the outer end portion of the sprag when traveling thereby, and means pressing on said resilient fingers to clamp the prismatic bodies while operated on by said grinder.

2. The construction as in claim 1 in which each finger has a presser plate movably mounted thereon and a resilient member between said presser plate and finger, and a cam located in proximity to said grinder for engaging said parallel plates to rigidly clamp the sprag in said holder while operated upon by said grinder.

3. A machine for fashioning end portions of prismatic bodies, comprising a rotating work holder including a rear head, a front head having a series of radially extending resilient fingers, and a jaw on each finger spaced from said rear head and fashioned to form in connection therewith a radially extending socket for receiving a prismatic body, an exchangeable member between said front and rear heads having a peripheral surface limiting the depth of engagement of the prismatic bodies with their respective sockets, means pressing on each finger to clamp the prismatic body against said rear head during a portion of the rotation of said holder, and a grinder positioned to engage and fashion the outer ends of the prismatic bodies while clamped in their respective sockets.

4. A machine for fashioning end portions of prismatic bodies, comprising a rotating work holder having a series of peripherally open radially extending sockets therein adapted to be successively loaded with prismatic bodies with their outer ends exposed, means for clamping each prismatic body in its socket during a portion of the rotation of said holder, a grinder positioned to engage and fashion the end portion of each prismatic body while clamped in its socket, a gauge for contacting with the fashioned end of said prismatic body after passing the grinder, and means controlled by said gauge for adjusting said grinder towards said rotating work holder when the depth of grinding is too shallow.

5. In a machine for fashioning end portions of prismatic bodies, a continuously rotating work holder and carrier having a series of generally radially extending peripherally open sockets for successive loading with prismatic bodies to hold the same with their outer ends exposed, a rotary cutter positioned to fashion the outer end portion of each of said bodies during continuous movement thereof with said holder, means for clamping each in its socket while operated upon by said cutter, and a loading means including a shuttle, a supply conduit for prismatic bodies connected thereto, and means for oscillating said shuttle to move with said holder in registration with a socket thereof in one phase of its oscillation and to shift into registration with another socket in the opposite phase of its oscillation.

6. The construction as in claim 5 in which said carrier includes a rigid head, a radially slotted flexible resilient head spaced from said rigid head and forming a series of separate clamping fingers for the respective sockets and biased towards clamping position.

7. In a machine for fashioning end portions of prismatic bodies, a continuously rotating work holder and carrier having a series of generally radially extending peripherally open sockets for successive loading with prismatic bodies to hold the same with their outer ends exposed, a rotary cutter positioned to fashion the outer end portion of each of said bodies during continuous movement thereof with said holder, means for clamping each in its socket while operated upon by said cutter, a loading means including a shuttle, a supply conduit for prismatic bodies connected thereto, and means for oscillating said shuttle to move with said holder in registration with a socket thereof in one phase of its oscillation and to shift into registration with another socket in the opposite phase of its oscillation, a second similar rotary work holder, an oscillatory shuttle between said work holders and beyond said cutter for successively transferring the fashioned prismatic bodies from the first holder to the second with the unfashioned ends of the prismatic body exposed in the latter, and a second rotary cutter positioned to cooperate with said second rotary holder to fashion the exposed ends of the prismatic bodies carried thereby.

DELTAN L. LESLIE.
REINO H. MUSTONEN.

References Cited in the file of this patent

UNITED STATES PATENTS

| Number | Name | Date |
|---|---|---|
| 1,863,251 | Person | June 14, 1932 |
| 1,976,103 | Archea | Oct. 9, 1934 |
| 1,978,360 | Archea | Oct. 23, 1934 |
| 2,105,872 | Warner | Jan. 18, 1938 |
| 2,123,825 | DeVlieg | July 12, 1938 |
| 2,407,985 | Henke | Sept. 24, 1946 |
| 2,455,004 | Garside | Nov. 30, 1948 |
| 2,586,953 | Johnson | Feb. 26, 1952 |